July 20, 1926.
C. H. THURBER
TEST PAPER
Filed Jan. 10, 1924    2 Sheets-Sheet 2
1,593,148
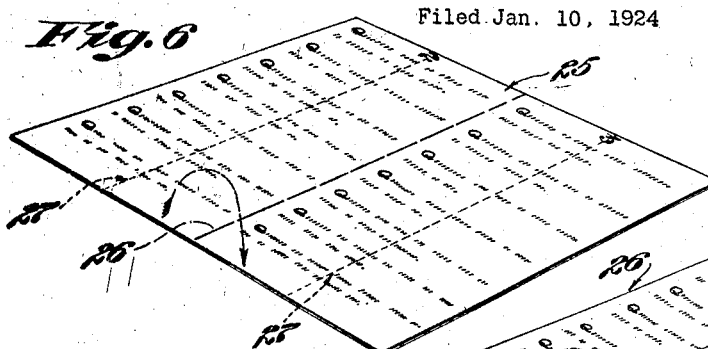
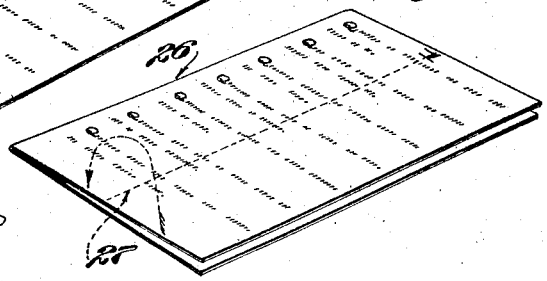
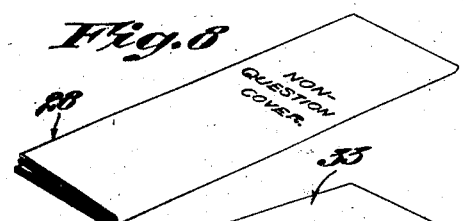
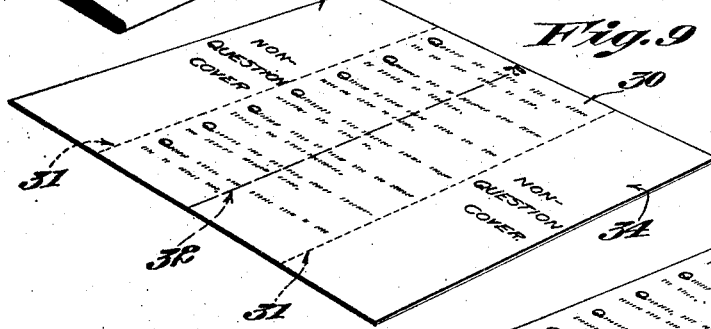
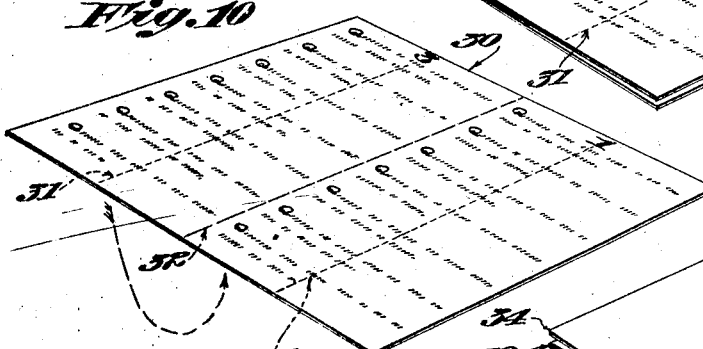
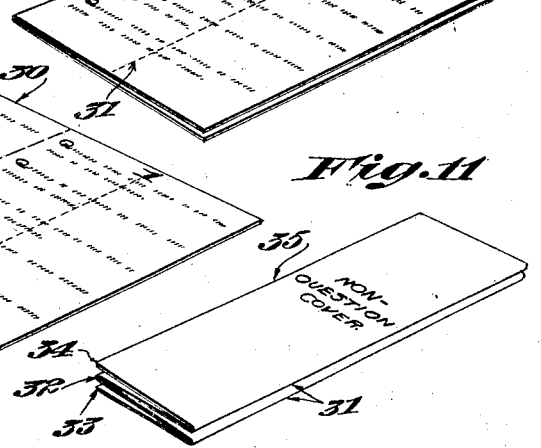

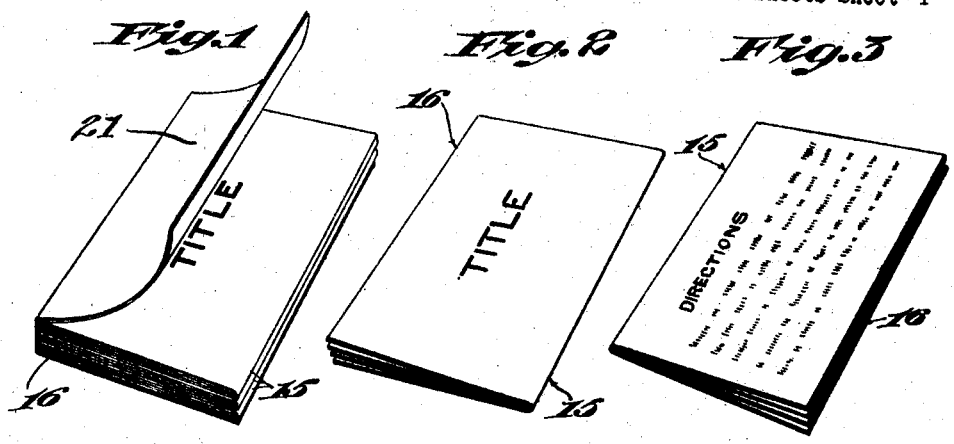
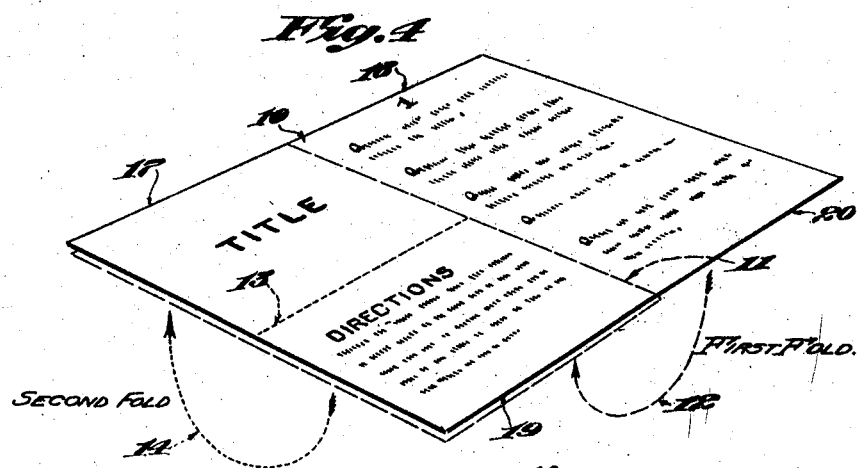
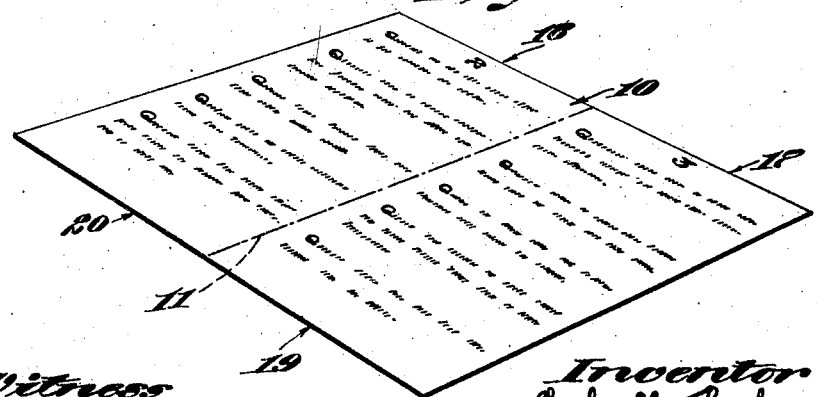

Patented July 20, 1926.

1,593,148

UNITED STATES PATENT OFFICE.

CHARLES H. THURBER, OF FRAMINGHAM, MASSACHUSETTS, ASSIGNOR TO GINN AND COMPANY, OF BOSTON, MASSACHUSETTS, A COPARTNERSHIP.

TEST PAPER.

Application filed January 10, 1924. Serial No. 685,380.

The present invention relates to an improvement in test papers.

In the test paper illustrated in the accompanying application executed of even date herewith, the sheet is folded but once, and that leaves two pages blank if all the questions are to be concealed.

The object of the present invention is to produce other forms of test papers convenient for manufacture and for shipment, and in which the paper is folded a plurality of times whereby not only are all the questions concealed, but a more economical use of the paper is secured. The invention consists in the test paper hereinafter described and particularly defined in the claim.

In the accompanying drawings illustrating the invention, Figs. 1, 2, 3, 4 and 5 illustrate the preferred form, in which Fig. 1 is a book of test papers, Fig. 2 is the obverse side of a signature for a book of test papers, Fig. 3 is the reverse side of the same, Fig. 4 illustrates one side of the test paper, and Fig. 5 the other side of the test paper; Figs. 6, 7 and 8 illustrate a second form of test paper in which Fig. 6 is a view of one side of a sheet, Fig. 7 a view of the same after it is folded once, and Fig. 8 a similar view after it is folded a second time and is ready for binding into book form; Figs. 9, 10, 11 and 12 illustrate a still different form of the invention, Fig. 9 being a view of one side of the sheet, Fig. 10 a view of the other side of the sheet, Fig. 11 a view of the sheet after it is folded comprising a test paper ready for use or binding, and Fig. 12 illustrates the test paper after it has been opened by the student ready for use.

The first form of the invention illustrated in Figs. 1 to 5 inclusive, is described as follows: The test paper 10 comprises a sheet of paper printed with two pages of questions on the inside, as shown in Fig. 5, and with one page of questions on the other side, see Fig. 4. The pages on the inside shown in Fig. 5 are pages 2 and 3, and the page on the other side is page 1. Alongside of page 1 is the non-question cover which may bear the title of the paper and the directions for its use. Referring to Fig. 4, the test paper is first folded along the broken line 11 by bending it around such line in the direction of the arrow 12, which indicates the first fold. That brings the sheet into a doubled condition, as shown in broken lines in Fig. 4. Then the sheet is folded again on the dotted line 13 by bending it about such line, as indicated by the arrow 14, which denotes the second fold. When thus folded the test paper comprises a signature of a book of test papers.

The free edge 15 of the signature is formed on the dotted line 13, and this free edge consists of a doubled paper, thereby uniting together the portions of the signature by this fold. The binding edge 16 of the signature consists of the edges of the tops 17 and 18 of the pages, and the bottoms 19 and 20 of such pages. These page tops and bottoms, therefore, when brought into adjusted position by the folding of the sheet, together comprise the binding edge of the signature, and these portions of the paper are bound together. The signatures are superposed with their binding edges over each other and glue is applied to the edge of the pile. This same glue may be, and preferably is, employed to hold the cover 21 on the book, or block, of test papers. When a single paper is detached from the book or block, as it may readily be by being torn off by the hand, the edges forming the binding portion of the signature will remain united together until the student separates them by thrusting his hand between the folds of the sheet and loosening the united edges. Then the paper may be folded out as shown in Fig. 4, and the student may address himself to the task of answering the questions found printed there, placing his answers upon the space provided, or upon other paper, if the length of the answers requires more room than may conveniently be found upon the sheet.

The form of test paper illustrated in Figs. 6, 7 and 8 is shown in perspective in Fig. 6, which shows pages 2 and 3 of the questions. This sheet is designated 25. It is folded along the broken line 26, with pages 2 and 3 as indicated in Fig. 6, opposed to each other, and it is then again folded along the dotted lines 27 which are now superposed, thereby forming the signature shown in Fig. 8. The binding edge 28 of this signature is glued, preferably by being coated with glue which is not only used to secure these edges together, but also to bind the signature into a book of test papers.

These test papers may be removed as described in connection with the form illustrated in the earlier figures of the drawing.

The form illustrated in Figs. 9, 10, 11 and 12 is described as follows: The sheet of paper 30 bears in its middle portion between the two dotted lines 31, page 2. This sheet of paper is folded along the line 32, and then the two non-question cover portions 33 and 34 are folded back, as shown in Fig. 11, so that the binding edges of the signature illustrated in that figure comprise the two marginal portions 33 and 34 and the fold 32. This binding edge 35 of the signature will be glued, and superposed signatures may be at the same time and by the same glue secured in a cover. When the student receives this paper after it has been detached from the book of test papers, he will open it by loosening the binding portions from each other and folding outwardly the non-question cover portions so that the paper will assume the form illustrated in Fig. 12, in which page 1 will confront him, and upon concluding the work of answering the questions on this page, he will turn over page 1 and find page 2 in the middle of the open sheet. Then he will find page 3 on the back of the sheet.

The test paper which forms the subject of this invention is printed with questions upon both sides, and it has non-question cover portions which, when the paper is folded in some one of the ways herein described, or otherwise, completely conceals the questions.

The invention is susceptible of embodiment in other forms than those herein illustrated and described, and comprehended within the scope of the following claim.

Having thus described the invention, what is claimed is:

A folded and sealed test-question paper having concealed question pages and an exposed non-question portion, the paper comprising a single sheet having a question portion and the non-question portion on the obverse side of the sheet and questions only on the reverse side of the sheet, the sheet being folded on a line dividing the question and non-question portions from each other, and on a line dividing the non-question portion into two opposed parts constituting the only exposed pages of the paper, the adjacent side edges of the pages being sealed together to prevent access to the concealed questions until the edges are unsealed.

CHARLES H. THURBER.